United States Patent
Jiang et al.

(10) Patent No.: US 10,761,731 B2
(45) Date of Patent: Sep. 1, 2020

(54) ARRAY CONTROLLER, SOLID STATE DISK, AND METHOD FOR CONTROLLING SOLID STATE DISK TO WRITE DATA

(71) Applicant: HUAWEI TECHNOLOGIES CO., LTD., Shenzhen, Guangdong (CN)

(72) Inventors: Peijun Jiang, Chengdu (CN); Qiang Xue, Chengdu (CN); Keji Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/889,209

(22) Filed: Feb. 6, 2018

(65) Prior Publication Data

US 2018/0165014 A1 Jun. 14, 2018

Related U.S. Application Data

(63) Continuation of application No. PCT/CN2015/096357, filed on Dec. 3, 2015.

(51) Int. Cl.
*G06F 12/00* (2006.01)
*G06F 3/06* (2006.01)
(Continued)

(52) U.S. Cl.
CPC ............ *G06F 3/0608* (2013.01); *G06F 3/065* (2013.01); *G06F 3/0688* (2013.01);
(Continued)

(58) Field of Classification Search
CPC ...... G06F 3/0608; G06F 3/065; G06F 3/0688; G06F 12/0246; G06F 12/0804;
(Continued)

(56) References Cited

U.S. PATENT DOCUMENTS 7,433,993 B2 * 10/2008 Sinclair ............... G06F 12/0246
711/103
7,610,434 B2 * 10/2009 Saito ..................... G06F 3/0613
711/103
(Continued)

FOREIGN PATENT DOCUMENTS

CN 102054533 A 5/2011
CN 103488583 A 1/2014
(Continued)

*Primary Examiner* — Kalpit Parikh
(74) *Attorney, Agent, or Firm* — Huawei Technologies Co., Ltd.

(57) ABSTRACT

Application relates to storage technologies, and in particular, to writing data in a storage system having solid state disks. Embodiments of the application provide an array controller, including a communication interface and a processor. The processor receives information about a logical block from a solid state disk. The information about the logical block includes a size of the logical block and indication information of the logical block, and the logical block includes one or more physical blocks. The processor sends multiple write data requests to the solid state disk. Each write data request includes data, and each write data request instructs the solid state disk to write the data into the logical block indicated by the indication information of the logical block. A total size of data included in the multiple write data requests is equivalent to the size of the logical block.

6 Claims, 7 Drawing Sheets

(51) Int. Cl.
  *G06F 12/02* (2006.01)
  *G06F 12/0804* (2016.01)
  *G06F 12/06* (2006.01)
  *G06F 12/0868* (2016.01)
(52) U.S. Cl.
  CPC ...... *G06F 12/0246* (2013.01); *G06F 12/0253* (2013.01); *G06F 12/06* (2013.01); *G06F 12/0804* (2013.01); *G06F 12/0868* (2013.01); *G06F 2212/1036* (2013.01); *G06F 2212/7201* (2013.01); *G06F 2212/7203* (2013.01); *G06F 2212/7204* (2013.01); *G06F 2212/7205* (2013.01); *G06F 2212/7208* (2013.01)
(58) Field of Classification Search
  CPC ................. G06F 12/06; G06F 12/0868; G06F 2212/7201; G06F 2212/7203; G06F 2212/7204; G06F 2212/1036; G06F 2212/7208; G06F 2212/7205
  See application file for complete search history.

(56) References Cited

U.S. PATENT DOCUMENTS

| | | | |
|---|---|---|---|
| 8,316,176 | B1 | 11/2012 | Phan et al. |
| 9,135,190 | B1* | 9/2015 | Bruce .................... G06F 13/16 |
| 2006/0026211 | A1* | 2/2006 | Potteiger ................ G06F 3/061 |
| 2008/0250195 | A1 | 10/2008 | Chow et al. |
| 2009/0248964 | A1* | 10/2009 | Yano .................. G06F 12/0246 |
| | | | 711/103 |
| 2010/0180072 | A1 | 7/2010 | Kogita et al. |
| 2011/0099323 | A1 | 4/2011 | Syu et al. |
| 2011/0125955 | A1* | 5/2011 | Chen .................. G06F 12/0246 |
| | | | 711/103 |
| 2011/0167208 | A1 | 7/2011 | So et al. |
| 2012/0059978 | A1 | 3/2012 | Rosenband et al. |
| 2012/0072680 | A1 | 3/2012 | Kimura et al. |
| 2012/0173790 | A1 | 7/2012 | Hetzler et al. |
| 2012/0254513 | A1* | 10/2012 | Uehara ................. G06F 3/0616 |
| | | | 711/103 |
| 2013/0173875 | A1 | 7/2013 | Kim et al. |
| 2013/0191594 | A1 | 7/2013 | Cleveland et al. |
| 2013/0305008 | A1 | 11/2013 | Kwon et al. |
| 2014/0101373 | A1 | 4/2014 | Lee et al. |
| 2015/0121003 | A1 | 4/2015 | Rosenband et al. |
| 2015/0212752 | A1 | 7/2015 | Nemazie et al. |
| 2015/0378888 | A1 | 12/2015 | Zhang et al. |
| 2016/0188206 | A1* | 6/2016 | Sinclair .................. G06F 3/061 |
| | | | 711/103 |
| 2017/0277608 | A1 | 9/2017 | Shi et al. |

FOREIGN PATENT DOCUMENTS

| | | |
|---|---|---|
| CN | 103744614 A | 4/2014 |
| CN | 104484283 A | 4/2015 |
| CN | 105094685 A | 11/2015 |
| RU | 2280273 C2 | 7/2006 |
| WO | 2009001514 A1 | 12/2008 |
| WO | 2010146767 A1 | 12/2010 |
| WO | 2011073902 A1 | 6/2011 |
| WO | 2015010597 A1 | 1/2015 |
| WO | 2015196464 A1 | 12/2015 |

* cited by examiner

ARRAY CONTROLLER, SOLID STATE DISK, AND METHOD FOR CONTROLLING SOLID STATE DISK TO WRITE DATA

CROSS-REFERENCE TO RELATED APPLICATIONS

This application is a continuation of International Application No. PCT/CN2015/096357, filed on Dec. 3, 2015, which is hereby incorporated by reference in its entirety.

TECHNICAL FIELD

Embodiments of the present application relate to the field of storage technologies, and in particular, to writing data in a storage system having solid state disks.

BACKGROUND

A flash memory is a non-volatile memory device. The flash memory uses flash memory chips as the storage medium and data stored in the memory chips would not be lost after power-off. Therefore, flash memories are widely used as external or internal storages. A flash memory device, which uses flash memory chips as the storage medium, is also known as a solid state disk (SSD) or a solid state drive (SSD).

A SSD generally includes multiple flash memory chips. Each flash memory chip includes several blocks. Generally, when storing data received from the outside, the SSD may concurrently write the data to multiple blocks to improve data processing efficiency. When performing garbage collection processing, the SSD needs to obtain valid data from multiple blocks and move the valid data to a free block or blocks. The operations may cause write amplification.

SUMMARY

Embodiments of the present application provide an array controller, a solid state disk, and a method for controlling data writing in a solid state disk. A segment of data, whose size is equal to an integer multiple of a standard block size, is written into the multiple blocks, so as to fill the multiple blocks, thereby reducing write amplification when the solid state disk performs garbage collection.

A first aspect of the present application provides an array controller. The array controller is located in a storage system. The storage system further includes at least one solid state disk. The array controller includes a communication interface and a processor. The communication interface is configured to communicate with the solid state disk. The processor receives information about a logical block from the solid state disk. The information about the logical block includes a size of the logical block and indication information of the logical block. The processor sends a plurality of write data requests to the solid state disk. Each write data request carries target data. Each write data request instructs the solid state disk to write the target data into the logical block. A total size of the target data carried in the write data requests is equal to the size of the logical block. After receiving the write data requests, the solid state disk writes, according to indication information in each write data request, the target data carried in the write data requests into the logical block. It should be noted that because the logical block includes one or more blocks, writing the target data into the logical block is actually writing the target data into the one or more blocks included in the logical block.

In this implementation manner, the solid state disk can write, according to the indication information, all of the target data carried in the write data requests into the same logical block, and fill the logical block. It may be understood by a person skilled in the art that, during garbage collection, the solid state disk performs collection in blocks. The target data is all written into the one or more blocks, and the one or more blocks do not include other data. If the target data is all released by the array controller subsequently, that is, marked as invalid data, the SSD may directly erase data from all the blocks in the logical block without moving valid data, thereby reducing write amplification during garbage collection.

In a first implementation manner of the first aspect, the blocks included in the logical block may be located in different channels. Generally, within the solid state disk, concurrent reading and writing between the channels may be performed. Therefore, when the blocks included in the logical block are located in different channels, the target data can be concurrently written into the logical block, thus improving data writing efficiency.

In a second implementation manner of the first aspect, the blocks included in the logical block may belong to a same channel. In some cases, concurrent reading and writing between multiple blocks in one channel may also be performed. Therefore, when the blocks included in the logical block belong to a same channel, the target data can be concurrently written into the logical block, which can also improve data writing efficiency.

With reference to either one of the foregoing implementation manners of the first aspect, in a third implementation manner of the first aspect, the logical block may be in a to-be-written state. A logical block in the to-be-written state is a logical block that has been allocated by the solid state disk to store data. A logical block has four states: free, to-be-written, full, and damaged. The solid state disk reports the logical block in the to-be-written state to the array controller, where data can be directly written into the logical block in the to-be-written state. Therefore, when receiving the write data requests from the array controller, the solid state disk may directly write the target data into the logical block in the to-be-written state according to the indication information carried in the write data requests.

With reference to any one of the foregoing implementation manners of the first aspect, in a fourth implementation manner of the first aspect, for the indication information of the logical block, the indication information may be an identifier that is allocated by the solid state disk to the logical block. When the indication information is the identifier of the logical block, each write data request that is sent by the array controller to the solid state disk may carry the identifier. After receiving the write data request, the solid state disk may write, according to the identifier, the target data in each write data request into the logical block corresponding to the identifier, so as to fill the logical block corresponding to the identifier.

With reference to any one of the foregoing implementation manners of the first aspect, in a fifth implementation manner alternative to the fourth implementation manner of the first aspect, the indication information of the logical block may include a logical address range that is allocated by the solid state disk to the logical block. When the indication information is the logical address range, each write data request that is sent by the array controller to the solid state disk carries a sub-range of the logical address range. After receiving the write data request, the solid state disk may determine, according to the sub-range, the logical block corresponding to the target data in each write data request, and write the target data into the logical block, so as to fill the logical block.

With reference to any one of the foregoing implementation manners of the first aspect, in a sixth implementation manner of the first aspect, the array controller may further include a cache, and the processor is further configured to read multiple pieces of target data from the cache. After receiving external data, the array controller may temporarily store the data in the cache instead of directly sending the data to the solid state disk for storage, and send data to the solid state disk when a size of data in the cache reaches a particular water mark (for example, the size of the logical block).

With reference to the sixth implementation manner of the first aspect, in a seventh implementation manner of the first aspect, the storage system further includes a host, and the array controller is located between the host and the solid state disk. In this implementation manner, the array controller may receive data from the host, and write the data into the cache.

A second aspect of the embodiments provides a solid state disk. The solid state disk includes at least one flash memory chip and a solid state disk controller. The at least one flash memory chip includes multiple channels, and each channel includes multiple blocks. The solid state disk controller is configured to send information about a logical block to an array controller. The information about the logical block includes a size of the logical block and indication information of the logical block. In addition, the solid state disk controller is further configured to receive a plurality of write data requests from the array controller. Each write data request carries target data. Each write data request instructs the solid state disk to write the target data into the logical block indicated by the indication information of the logical block. In addition, a total size of the target data carried in the write data requests is equal to the size of the logical block. The solid state disk controller then writes the target data carried in each write data request into the logical block indicated by the indication information. It should be noted that because the logical block includes one or more blocks, writing the target data into the logical block is actually writing the target data into the one or more blocks included in the logical block.

In this implementation manner, the solid state disk reports the information about the logical block to the array controller. The information about the logical block includes the size of the logical block and the indication information of the logical block. Therefore, the array controller may send the write data requests to the solid state disk according to the information about the logical block. Specifically, the total size of the target data carried in the write data requests that are sent by the array controller to the solid state disk is equal to the size of the logical block. Each write data request instructs the solid state disk to write the target data into the logical block indicated by the indication information of the logical block. Therefore, the solid state disk may write, according to the indication information, all of the target data carried in the write data requests into the same logical block, and fill the logical block. Because in this embodiment, one logical block includes one or more blocks, it means that the target data is written into the one or more blocks, and these blocks are filled. It may be understood by a person skilled in the art that during garbage collection, the solid state disk performs collection in blocks. The target data is all written into the one or more blocks and the one or more blocks do not include other data. If the target data is all released by the array controller subsequently, that is, marked as invalid data, the SSD may directly erase data from all the blocks in the logical block without moving valid data, thereby reducing write amplification during garbage collection.

In a first implementation manner of the second aspect, the blocks included in the logical block may be located in different channels. Generally, within the solid state disk, concurrent reading and writing between channels may be performed. Therefore, when the blocks included in the logical block are located in different channels, the target data can be concurrently written into the logical block, which improves data write efficiency.

In a second implementation manner of the second aspect, the blocks included in the logical block may belong to a same channel. In some cases, concurrent reading and writing between multiple blocks in one channel may also be performed. Therefore, when the blocks included in the logical block belong to a same channel, the target data can be concurrently written into the logical block, which can also improve write data efficiency.

With reference to either one of the foregoing implementation manners of the second aspect, in a third implementation manner of the second aspect, the logical block may be a logical block in a to-be-written state. The logical block in the to-be-written state is a logical block that has been allocated by the solid state disk to store data. A logical block has four states: free, to-be-written, full, and damaged. The solid state disk reports the logical block in the to-be-written state to the array controller, where data can be directly written into the logical block in the to-be-written state. Therefore, when receiving the write data requests from the array controller, the solid state disk may directly write the target data into the logical block in the to-be-written state according to the indication information carried in the write data requests.

With reference to any one of the foregoing implementation manners of the second aspect, in a fourth implementation manner of the second aspect, the indication information may be an identifier that is allocated by the solid state disk to the logical block. When the indication information is the identifier of the logical block, each write data request received by the solid state disk may carry the identifier. After receiving the write data request, the solid state disk may write, according to the identifier, the target data in each write data request into the logical block corresponding to the identifier, so as to fill the logical block corresponding to the identifier.

With reference to any one of the foregoing implementation manners of the second aspect, in a fifth implementation manner alternative to the fourth implementation manner of the second aspect the indication information of the logical block may include a logical address range that is allocated by the solid state disk to the logical block. When the indication information is the logical address range, each write data request received by the solid state disk may carry a sub-range of the logical address range. After receiving the write data request, the solid state disk may determine, according to the sub-range, the logical block corresponding to the target data in each write data request, and write the target data into the logical block, so as to fill the logical block.

With reference to the third to fifth implementation manners of the second aspect, in a sixth implementation manner of the second aspect, the solid state disk controller is further configured to reclaim the indication information allocated to the logical block. Because the indication information is allocated to only the logical block in the to-be-written state, when the logical block is filled, the indication information of the logical block may be reclaimed for another logical block in the to-be-written state for use.

With reference to any one of the foregoing implementation manners of the second aspect, in a seventh implementation manner of the second aspect, the solid state disk controller may be specifically configured to send an SCSI WRITE command to the array controller. The command includes a GROUP NUMBER field, and the field is used to carry the indication information of the logical block. In this implementation manner, a private command may be provided to report the indication information of the logical block. A conventional SCSI command does not include the GROUP NUMBER field. In this embodiment, the GROUP NUMBER field may be added to the SCSI WRITE command to report the indication information of the logical block.

A third aspect of the embodiments of the present application provides a method for controlling a solid state disk to write data, where the method is applied to the array controller provided in the first aspect.

A fourth aspect of the embodiments of the present application provides a method for controlling a solid state disk to write data, where the method is applied to the array controller provided in the second aspect.

A fifth aspect of the embodiments of the present application provides an apparatus for controlling a solid state disk to write data, where the apparatus is located in the array controller provided in the first aspect.

A sixth aspect of the embodiments of the present application provides an apparatus for controlling a solid state disk to write data, where the apparatus is located in the array controller provided in the second aspect.

According to the methods and the apparatuses provided in the third aspect to the sixth aspect, a segment of data, whose size is equal to an integer multiple of a standard size of a block, can be written into multiple blocks, to fill the multiple blocks. Write amplification is reduced when the solid state disk performs garbage collection.

The embodiments of the present application provide a computer program product, including a computer readable storage medium that stores program code, where an instruction included in the program code may be executed by the array controller in the first aspect, and is used to perform at least one method in the third aspect.

The embodiments of the present application provide a computer program product, including a computer readable storage medium that stores program code, where an instruction included in the program code may be executed by the array controller in the second aspect, and is used to perform at least one method in the fourth aspect.

The foregoing computer program product provided in the embodiments of the present application can write a segment of data whose size is equal to an integer multiple of a standard size of a block into one or more blocks, so as to fill the one or more blocks, thereby reducing write amplification when a solid state disk performs garbage collection.

BRIEF DESCRIPTION OF DRAWINGS

The following briefly introduces the accompanying drawings used in describing the embodiments. Apparently, included in the following description are merely some embodiments of the present application, and a person of ordinary skill in the art may derive other embodiments from these accompanying drawings without creative efforts.

DESCRIPTION OF EMBODIMENTS

Embodiments of the present application provide an array controller, a solid state disk, and a method for controlling a solid state disk to write data. A segment of data, whose size is equal to an integer multiple of a standard block size, is written into a corresponding number of blocks, so as to fill the blocks, thereby reducing write amplification when the solid state disk performs garbage collection.

Figures 1, 2:
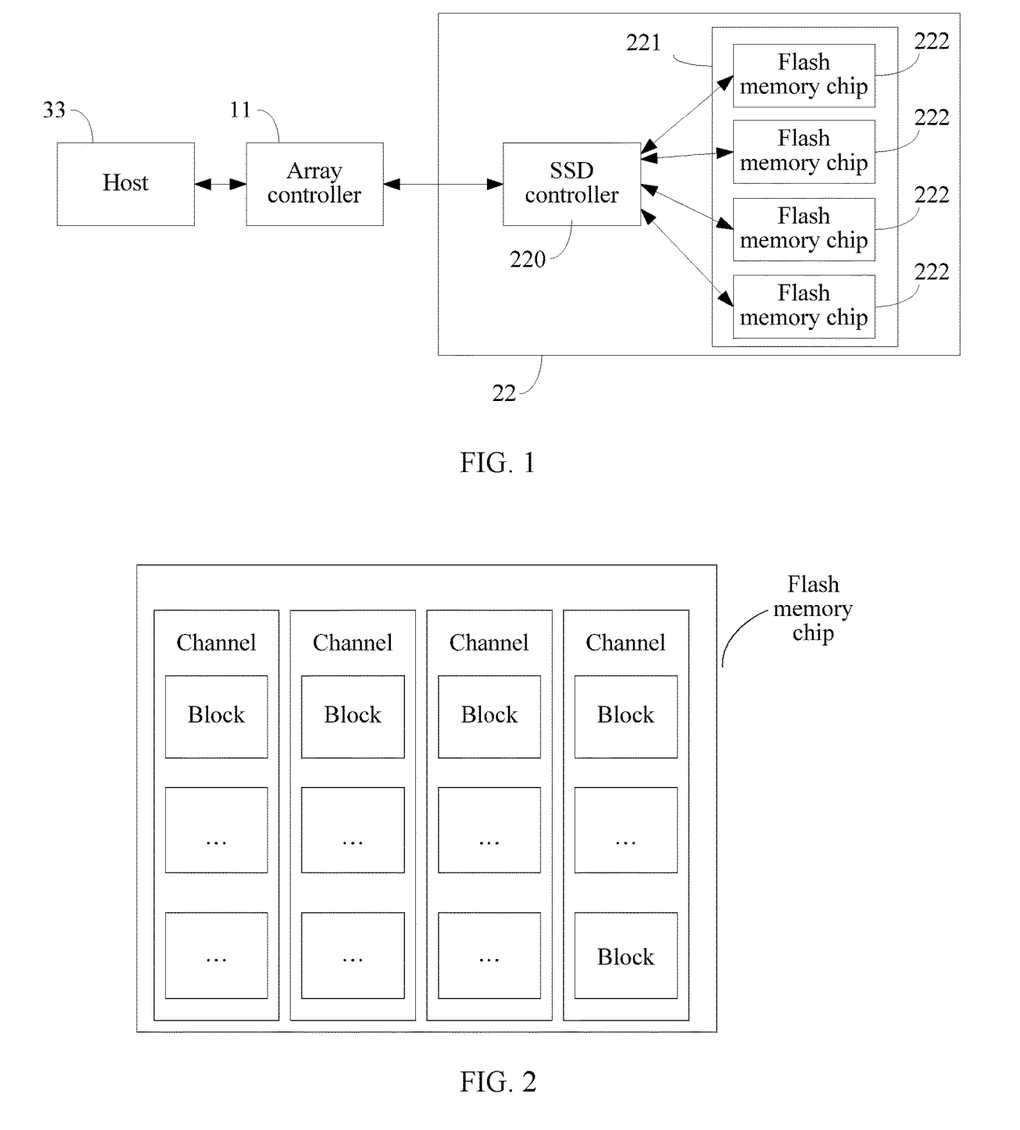
FIG. 1 is a block diagram of a storage system according to an embodiment of the present application.
FIG. 2 is a schematic diagram of a flash memory chip according to an embodiment of the present application.

FIG. 1 is a block diagram of a storage system according to an embodiment of the present application. The storage system includes a host 33, an array controller 11, and a solid state disk 22. The host 33 may be a terminal device such as a server or a desktop computer.

The array controller 11 is located between the host 33 and the solid state disk 22, and may be a computing device, for example, a server or a desktop computer. An operating system and other application programs are installed in the array controller 11. The array controller 11 is capable of receiving input/output (I/O) requests from the host 33, store data carried in the I/O requests, and write data stored in the array controller 11 into the solid state disk 22 when a particular condition is satisfied.

The solid state disk or solid state drive (SSD) 22 is a memory device using flash memory chips as storage medium.

The network structure of FIG. 1 is only exemplary for description, and constitutes no limitation to any specific networking manner. For example, a cascading tree network or a ring network may be used, provided that the array controller 11 and the solid state disk 22 can communicate with each other.

The solid state disk 22 includes an SSD controller 220 and a storage medium 221. The SSD controller 220 is capable of performing an operation according to a request, such as a write data request or a read data request, received from the array controller 11.

The storage medium 221 generally includes a plurality of flash memory chips. As shown in FIG. 2, each flash memory chip includes multiple channels, and each channel includes several blocks. Generally, a flash memory chip may be partitioned into blocks of a standard size. The standard size of a block equals to a size of data that can be stored in the block that is idle and that does not include bad page. Generally, the standard size of the block may be the $N^{th}$ power of 2 Megabytes (MB), where N is a positive integer. The SSD performs erase operations block by block. For example, when the SSD needs to perform garbage collection, the SSD may first move valid data from one block to another new block, and then erase all data (including the valid data and invalid data) stored in the original block. In this embodiment of the present application, valid data in a block refers to data that is stored in the block and that has not been modified, and this piece of data is may be read. Invalid data in a block refers to data that is stored in the block and that has been modified, and this piece of data is no longer to be read. It is known by persons skilled in the art that, because of an erase feature of the flash memory chip, data stored in a block cannot be directly modified like data stored in a common mechanical hard drive. When data in a block needs to be modified, the SSD controller 220 finds a new block and writes modified data into the new block, and the data in the original block becomes invalid data. The invalid data is erased when the SSD performs garbage collection.

Figure 3:
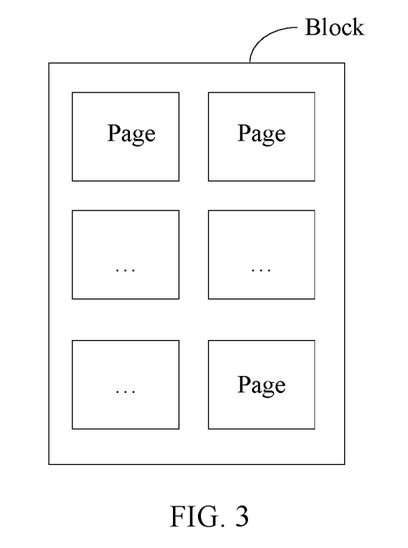
FIG. 3 is a schematic diagram of a block according to an embodiment of the present application.

In addition, as shown in FIG. 3, each block includes several pages. The SSD writes data in pages when executing a write data request. For example, the array controller 11 sends a write data request to the SSD controller 220, where the write data request carries logical block addresses (LBA) and data, and the LBAs are addresses that are visible and accessible to the array controller 11. After receiving the write data request, the SSD controller 220 writes the data into pages of one or more blocks according to a set policy. Addresses of the pages into which the data is written are addresses at which the data is actually stored, and are also referred to as physical addresses. The SSD includes a flash translation layer (FTL), configured to establish and store a correspondence between the LBAs and the physical addresses. When the array controller 11 subsequently sends a read data request carrying the LBAs to the SSD controller 220 to request to read the data, the SSD controller 220 reads the data according to the LBAs and the correspondence between the LBAs and the physical addresses, and sends the data to the array controller 11.

When the array controller 11 reads a segment of data from a cache, and sends the segment of data to the SSD, generally, the segment of data is a segment of data with contiguous logical addresses. However, when receiving the write data request, the SSD controller 220 writes, according to the policy set by the SSD controller 220, the data into the pages (that is the physical addresses) of the one or more blocks. It may be understood by a person skilled in the art that actually, these physical addresses are not necessarily contiguous. That is, from the perspective of the array controller 11, the segment of data with the contiguous logical addresses is actually written into physical space of the SSD in a scattered manner. The following describes how to write data by an SSD in the prior art with reference to FIG. 4.

Figure 4:
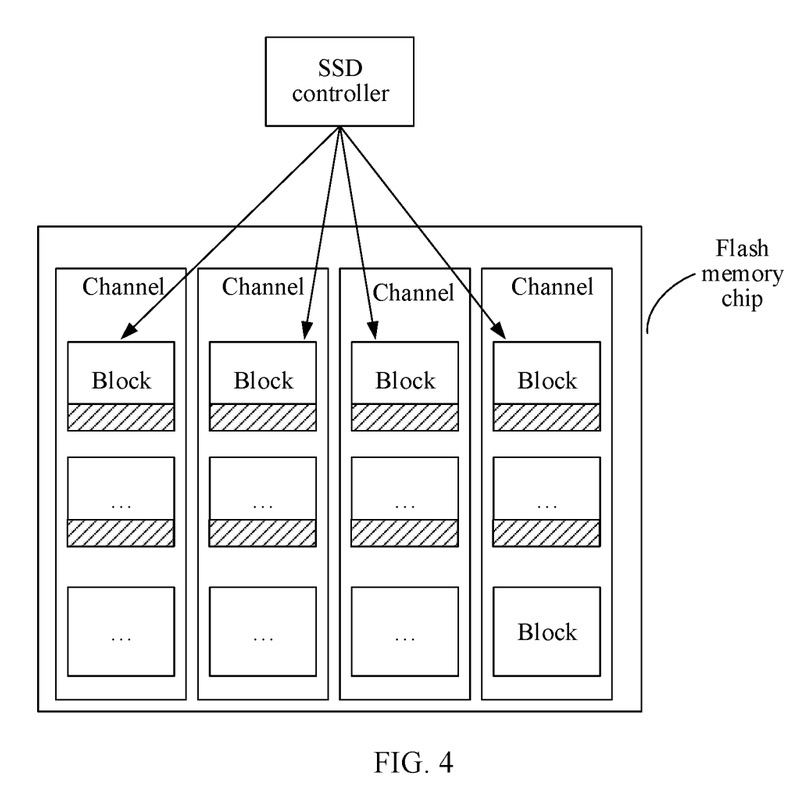
FIG. 4 is a schematic diagram of storing data by a solid state disk in the prior art according to an embodiment of the present application.

FIG. 4 is a schematic diagram of how to write data by an SSD in the prior art. Generally, because the solid state disk 22 may concurrently write data into channels, after the array controller 11 sends data to the solid state disk 22, the SSD controller 220 generally selects one block from each channel, and concurrently writes the data into the multiple blocks. It may be understood that the solid state disk 22 may also concurrently write the data into multiple blocks in one channel. As shown in FIG. 4, after the data is written into the multiple blocks, each block provides a part of space to store a part of the data. In FIG. 4, a white part of a block represents free space of the block, and a gray part represents used space of the block after a part of the data is written into the block. Therefore, from the perspective of the array controller 11, a segment of data with contiguous logical addresses is stored in multiple blocks in a scattered manner, and data belonging to different logical address segments is written into different blocks. It may be known by a person skilled in the art that a garbage collection operation is regularly performed in the SSD, and erasing is performed in blocks during a garbage collection operation. The segment of data with the contiguous logical addresses is stored in the multiple blocks in a scattered manner, and the data belonging to the different logical address segments is written into the different blocks. During the garbage collection, valid data needs to be moved from multiple blocks to a free block, which increases write amplification caused by the garbage collection. The write amplification means that data written into a flash memory chip is more than data that is written by a host into an SSD.

Figure 5:
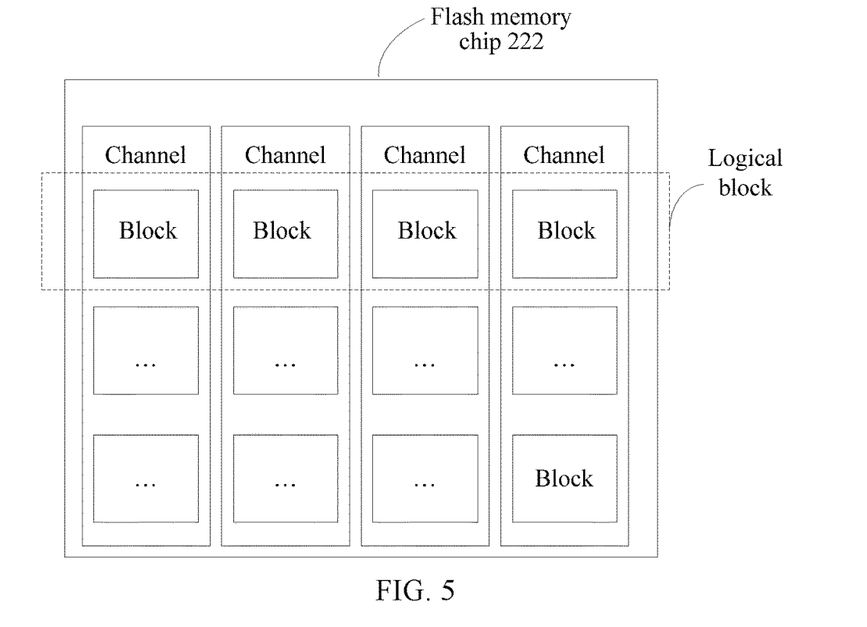
FIG. 5 is a schematic diagram of a logical block according to an embodiment of the present application.

In this embodiment, as shown in FIG. 5, one block may be taken out of each channel, to form a logical block. That is, the logical block in this embodiment includes multiple blocks, and the blocks are located in different channels. It may be understood that one block may also be taken out of each of a part of the channels, to form a logical block. Likewise, the multiple blocks included in the logical block are separately located in different channels. A size of the logical block is an integer multiple of a standard size of a block, and depends on a quantity of blocks included in the logical block. In this embodiment, the size of the logical block may be stored in the array controller 11 in advance. After receiving a write data request from the host 33, the array controller 11 may temporarily store the write data request in the cache of the array controller 11, and send data to the SSD for storage when the data in the cache reaches the size of the logical block.

In this embodiment, logical blocks are classified into four types according to states of the logical blocks: free logical block, to-be-written (or writing) logical block, full logical block, and damaged logical block. A logical block in a free state refers to a logical block in which data has been erased. A logical block in a to-be-written state refers to a logical block that has been allocated for data writing. A logical block in a full state refers to a logical block whose space has been filled, and the logical block in the full state may become a logical block in a free state after erasing; a logical block in a damaged state refers to a damaged logical block that cannot be used. A logical block for storing data mentioned in this embodiment is actually a logical block in a to-be-written state. Therefore, unless otherwise stated in the following description, a logical block refers to the logical block in the to-be-written state.

To identify those logical blocks in the to-be-written state, in an optional implementation manner, the SSD allocates an identifier to each logical block. The identifier may be a digit, a letter, or another symbol for uniquely identifying the logical block, or may be any combination of a digit, a letter, or another symbol. For example, an identifier of a logical block is 0, an identifier of another logical block is 1, an identifier of still another logical block is 2, and so on.

In another optional implementation manner, the SSD allocates a logical address range to each logical block. For example, a logical address range corresponding to a logical block is 0 MB to 1023 MB, a logical address range corresponding to another logical block is 1024 MB to 2047 MB, a logical address range corresponding to still another logical block is 2048 MB to 3071 MB, and so on.

The SSD controller 220 needs to report the identifier of the logical block or the logical address range of the logical block to the array controller 11. When sending data to the SSD for storage, the array controller 11 adds the identifier of the logical block to a write data request and send the write data request to the SSD, to instruct the SSD to write the data into the logical block corresponding to the identifier. Alternatively, a start logical address and a length in a write data request are designated according to the logical address range of the logical block. If there are multiple logical blocks in the to-be-written state, the array controller 11 receives identifiers of the multiple logical blocks or logical address ranges of the multiple logical blocks. The array controller 11 selects any one of the multiple logical blocks, and sends a write data request to the SSD according to an identifier or a logical address range of the logical block.

Figure 6:
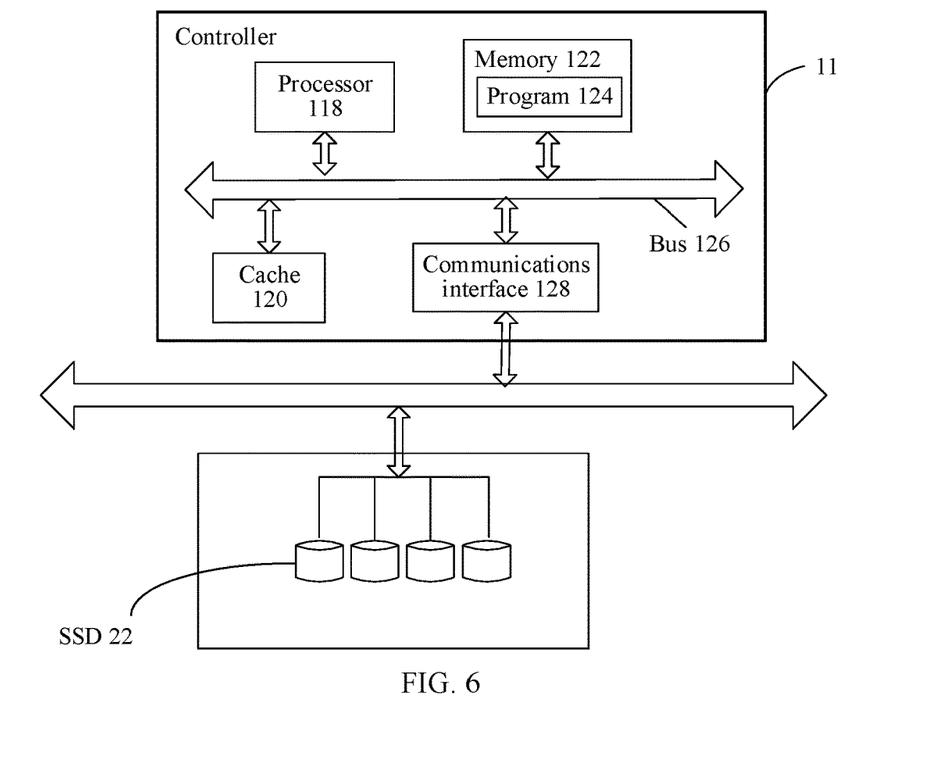
FIG. 6 is a schematic structural diagram of an array controller according to an embodiment of the present application.

The following describes a hardware structure of the array controller 11. FIG. 6 is a schematic structural diagram of the array controller 11 according to an embodiment of the present application. As shown in FIG. 6, the array controller 11 mainly includes a processor 118, a cache 120, a memory 122, a communication bus 126, and a communication interface 128. The processor 118, the cache 120, the memory 122, and the communication interface 128 communicate with each other by using the communication bus 126.

The communication interface 128 is configured to communicate with the host 33 or the solid state disk 22.

The processor 118 may be a central processing unit CPU or an application specific integrated circuit (ASIC), or is configured as one or more integrated circuits that implement this embodiment of the present application. In this embodiment of the present application, the processor 118 may be configured to receive a write data request or a read data request from the host 33, process the write data request or the read data request, send the write data request or the read data request to the solid state disk 22, and perform another operation.

The memory 122 is configured to store a program 124. The memory 122 may include a high-speed RAM memory, and may further include a non-volatile memory, such as at least one magnetic disk memory. It may be understood that the memory 122 may be any non-transitory computer-readable medium that can store program code, such as a random access memory (RAM), a magnetic disk, a hard disk, an optical disc, a solid state disk (SSD), or a non-volatile memory.

The program 124 may include program code, where the program code includes a computer operation instruction.

The cache 120 is configured to temporarily store data received from the host 33 or data read from the solid state disk 22. The cache 120 may be any non-transitory machine-readable medium that can store data, such as a RAM, a ROM, a flash memory, or a solid state disk (SSD), which is not limited herein. For example, when receiving a write data request from the host 33, the array controller 11 may store the write data request in the cache 120, and the processor 118 processes the write data request. Optionally, when receiving multiple write data requests from the host 33, the array controller 11 may temporarily store the multiple write data requests in the cache 120. When a size in the cache 120 reaches a water mark (for example, a size of data stored in the cache 120 reaches a size of a logical block), the array controller 11 may read data whose size is equal to the size of the logical block from the cache 120. Then the array controller 11 sends the data to the solid state disk 22 for persistent storage.

In addition, the memory 122 and the cache 120 may be integrated or disposed separately, which is not limited in this embodiment of the present application.

Figure 7:
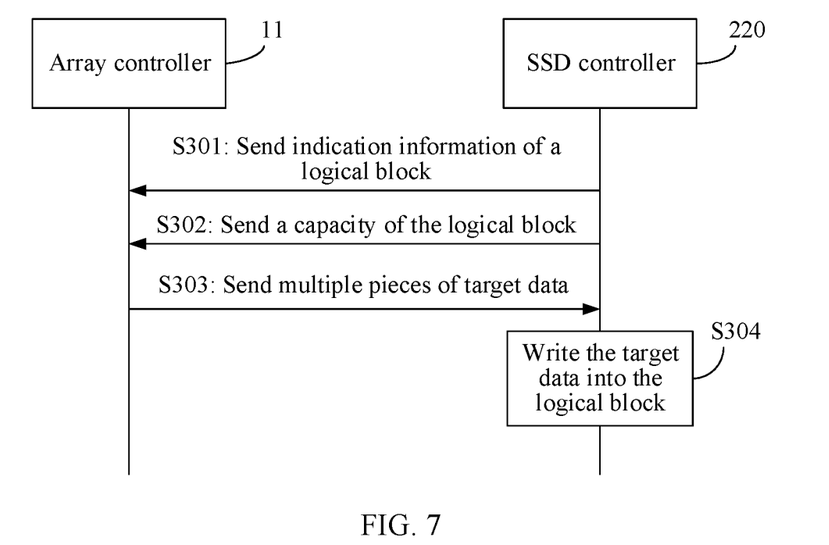
FIG. 7 is a schematic flowchart of a method for controlling a solid state disk to write data according to an embodiment of the present application.

The following describes a process of a method for writing data into a solid state disk according to an embodiment of the present application. The method for writing data into a solid state disk in this embodiment of the present application may be applied to the storage system shown in FIG. 1 and the array controller 11 shown in FIG. 6. As shown in FIG. 7, the method includes the following steps:

Step S301: An SSD controller 220 sends indication information of a logical block to an array controller 11.

Specifically, the SSD controller 220 sends the indication information of the logical block to a processor 118 of the array controller 11. The indication information of the logical block may be an identifier that is allocated by a solid state disk 22 to the logical block, or may be a logical address range that is allocated by a solid state disk 22 to the logical block, or other information for indicating a particular logical block.

Step S302: The SSD controller 220 sends a size of the logical block to the array controller 11.

Specifically, the SSD controller 220 sends the size of the logical block to the processor 118 of the array controller 11, and the processor 118 receives the size of the logical block. It should be noted that step S302 and step S301 are not necessarily performed in a particular order. That is, in this embodiment, provided that the SSD controller 220 sends the size of the logical block to the array controller 11, a time period or step in which the size of the logical block is sent to the array controller 11 is not limited. Moreover, the information may be sent separately, or may be sent together with other information, for example, the identifier of the logical block.

Step S303: The array controller 11 sends multiple pieces of target data to the SSD controller 220, where a sum of lengths of the multiple pieces of target data is equal to the size of the logical block.

Specifically, the processor 118 of the array controller 11 adds the multiple pieces of target data to multiple write data requests, and sends the multiple write data requests to the SSD controller 220.

When the indication information is the identifier of the logical block, each write data request further needs to carry the identifier of the logical block. When the indication information is the logical address range of the logical block, each write data request further needs to carry a sub-range of the logical address range. These two cases are described in detail in implementation manners shown in FIG. 9 and FIG. 10.

Step S304: The SSD controller 220 writes the multiple pieces of target data into the logical block.

Specifically, after receiving the multiple write data requests in step S303, the SSD controller 220 may determine, according to indication information in each write data request, the logical block indicated by the indication information. The SSD controller 220 then write the target data in each write data request into the logical block.

In the prior art, a write data request that is sent by the array controller 11 to the solid state disk 22 does not include the indication information of the logical block. Therefore, after receiving the write data request, the SSD controller 220 in the prior art generally selects multiple blocks and concurrently writes data into the multiple blocks, which causes the data to be stored in the blocks in a scattered manner. However, in this embodiment, the processor 118 adds the identifier of the logical block to the multiple write data requests and sends the multiple write data requests to the solid state disk 22, to instruct the solid state disk 22 to write all the target data in these write data requests into the logical block indicated by the indication information. It should be noted that because the logical block includes one or more blocks, writing the target data into the logical block is actually writing the target data into the one or more blocks included in the logical block.

Figure 8:
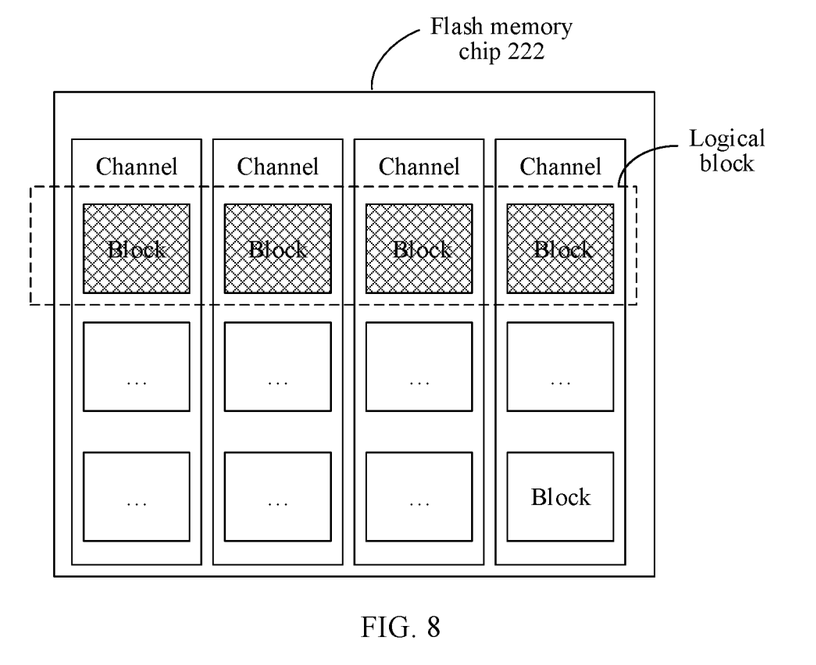
FIG. 8 is a schematic diagram of storing data by a solid state disk according to an embodiment of the present application.

Therefore, in step S304, after receiving the multiple write data requests, the SSD controller 220 may write the target data carried in each write data request into the logical block indicated by the indication information. Moreover, because the sum of the lengths of the target data is equal to the size of the logical block, the logical block is just filled after the SSD controller 220 writes the target data carried in the write data requests into the logical block (as shown in FIG. 8).

According to the implementation manner shown in FIG. 7, the multiple pieces of target data are stored in one logical block, that is, one or more blocks. These pieces of target data are all written into the one or more blocks, and the one or more blocks do not include other data. If these pieces of target data are all released by the array controller subsequently, that is, marked as invalid data, an erase operation may be directly performed on the blocks without moving valid data, which reduces a problem of write amplification during garbage collection.

Specifically, when the array controller 11 needs to perform a garbage collection operation on the solid state disk, the array controller 11 may generally send a read command to the solid state disk 22, to request to read valid data in a logical block of the solid state disk 22. After the solid state disk 22 sends the valid data to the array controller 11, the array controller 11 sends a write command to the solid state disk 22, to request to write the valid data into a new logical block. Then, the array controller 11 sends a trim command to the solid state disk 22, to indicate that the original logical block becomes invalid. When performing a garbage collection operation within the solid state disk, the solid state disk finds that the logical block is invalid and may consider that all data stored in the logical block is invalid data, thereby directly performing erasing data from blocks included in the logical block without acquiring the valid data or moving the valid data again. In this way, a problem of write amplification when the solid state disk performs garbage collection is reduced.

The following describes a process of a method for writing data into a solid state disk according to an embodiment of the present application. The method for writing data into a flash memory apparatus in this embodiment of the present application may be applied to the storage system shown in FIG. 1 and the array controller 11 shown in FIG. 6. As shown in FIG. 8, the method includes the following steps:

Step S101: An SSD controller 220 determines a logical block in a to-be-written state from multiple logical blocks included in an SSD.

As described above, logical blocks are generally in four states: free, to-be-written, full, and damaged. In this embodiment, logical blocks in the to-be-written state are selected from these logical blocks, and are put into a logical block queue. When data needs to be written, any logical block may be directly acquired from the logical block queue for data writing. The logical block queue is a data structure for managing logical blocks in the to-be-written state. It may be understood that in this embodiment, in addition to the queue, another data structure, for example, a linked list, may also be used to manage the logical blocks. The logical block queue may be stored in a cache of the SSD controller 220 or a flash memory chip.

There may be one or more determined logical blocks in the to-be-written state.

Step S102: The SSD controller 220 allocates an identifier to the logical block in the to-be-written state.

The identifier may be a number, for example, 0, 1, 2, . . . , or may be another symbol for uniquely identifying the logical block in the to-be-written state, or may be any combination of a digit, a letter, or another symbol.

Step S103: The SSD controller 220 sends the identifier that is allocated to the logical block in step S102 to an array controller 11.

In this embodiment, the SSD controller 220 may send the identifier to the array controller 11 by using an SCSI WRITE command, where the SCSI WRITE command includes a GROUP NUMBER field, and the field may be used to carry the identifier.

Step S104: The SSD controller 220 sends a size of the logical block to the array controller 11.

This step is similar to step S302 in FIG. 7, and details are not described herein again.

Step S105: The array controller 11 receives multiple pieces of data from a host 33.

The multiple pieces of data may be sent by the host 33 to the array controller 11 by using multiple write commands. Specifically, a processor 118 of the array controller 11 receives the multiple pieces of data from the host 33, where each write command carries at least one piece of data and a host logical address range of the data. A host logical address refers to an address of storage space that is presented by the array controller 11 to the host 33. Host logical address ranges of data may be not contiguous. For example, a host logical address range of a piece of data is 0x40000 to 0x40020, a host logical address range of another piece of data is 0x10010 to 0x10020, and the host logical address ranges of these two pieces of data are not contiguous. It should be noted that in actual application, the write command may carry a start host logical address and a length, and the host logical address range is obtained according to the start host logical address and the length.

Step S106: The array controller 11 writes the received multiple pieces of data into a cache 120.

Specifically, the processor 118 of the array controller 11 writes the received multiple pieces of data into the cache 120.

Generally, after receiving the data from the host 33, the array controller 11 temporarily writes the data into the cache 120 instead of directly writing the data into a solid state disk 22. When storage space of the cache 120 reaches a particular water mark, the processor 118 reads a part of or all data from the cache 120, and sends the data to the SSD 22 for persistent storage.

It should be noted that steps S105 and S106 and steps S101 to S104 are not necessarily perform in a particular order. That is, a process of receiving and temporarily storing, by the array controller 11, target data from the host 33 and a process of receiving information about the logical block from the SSD 22 do not conflict. They are not necessarily executed in a particular order, and may be concurrently executed.

Step S107: The array controller 11 reads multiple pieces of target data from the cache 120.

Specifically, the processor 118 of the array controller 11 reads the multiple pieces of target data from the cache 120.

A sum of lengths of the multiple pieces of target data is equal to the size of the logical block. In this embodiment, to be distinguished from the data that is received by the array controller 11 from the host 33, data read from the cache 120 is referred to as target data. The sum of the lengths of these pieces of target data is equal to the size of the logical block. When the processor 118 generates multiple write data requests and sends the multiple write data requests to the solid state disk 22, it may be considered that each write data request carries one piece of target data. When a size of the data that is received by the array controller 11 from the host 33 and that is stored in the cache 120 exceeds the size of the logical block, the processor 118 needs to read only multiple pieces of target data whose size is equal to the size of the logical block from the cache 120. Moreover, when a size of the data received from the host 33 and stored in the cache 120 does not reach the size of the logical block, the processor 118 may not read data from the cache 120, and perform processing until the data in the cache 120 reaches the size of the logical block.

Step S108: The array controller 11 sends multiple write data requests to a solid state disk 22. Each write data request carries target data, a total size of the target data carried in the multiple write data requests needs to be equal to the size of the logical block, and each write data request carries the identifier of the logical block.

Specifically, the processor 118 of the array controller 11 sends the multiple write data requests to the solid state disk 22.

It may be understood that if the solid state disk 22 sends identifiers of multiple logical blocks to the array controller 11, the array controller 11 may select any identifier from the identifiers, and add the identifier to the multiple write data requests.

In addition, in this embodiment, the write data request that is sent by the array controller 11 to the solid state disk 22 may also include a start logical address and a length (or a logical address range) of each piece of target data. The logical address herein is different from the host logical address in step S105. The logical address herein is an address of storage space that is presented by the solid state disk 22 to the array controller 11, while the host logical address in step S105 is the logical address of the storage space that is presented by the array controller 11 to the host 33. In addition, it should be noted that when the array controller 11 designates the logical address range, logical address ranges of all the target data are contiguous. The array controller 11 sends the start logical address and the length of each piece of target data to the solid state disk 22. After writing the target data into blocks included in the logical block, the SSD controller 220 may store, in an FTL, a correspondence between the start logical addresses and physical addresses into which the target data is actually written. If the array controller 11 needs to read the target data subsequently, the array controller 11 may add the start logical address and the length of the target data to a read data request, and send the read data request to the solid state disk 22. The SSD controller 220 may acquire a physical address of the target data according to the logical address, the length, and the correspondence stored in the FTL, so as to read the target data and send the target data to the array controller 11.

Step S110: The SSD controller 220 reclaims the identifier of the logical block.

Because the logical block has been filled with data, and is in the full state, the SSD controller 220 may reclaim the identifier, delete the logical block from the logical block queue, and allocate the identifier to another logical block in the to-be-written state.

Figure 10:
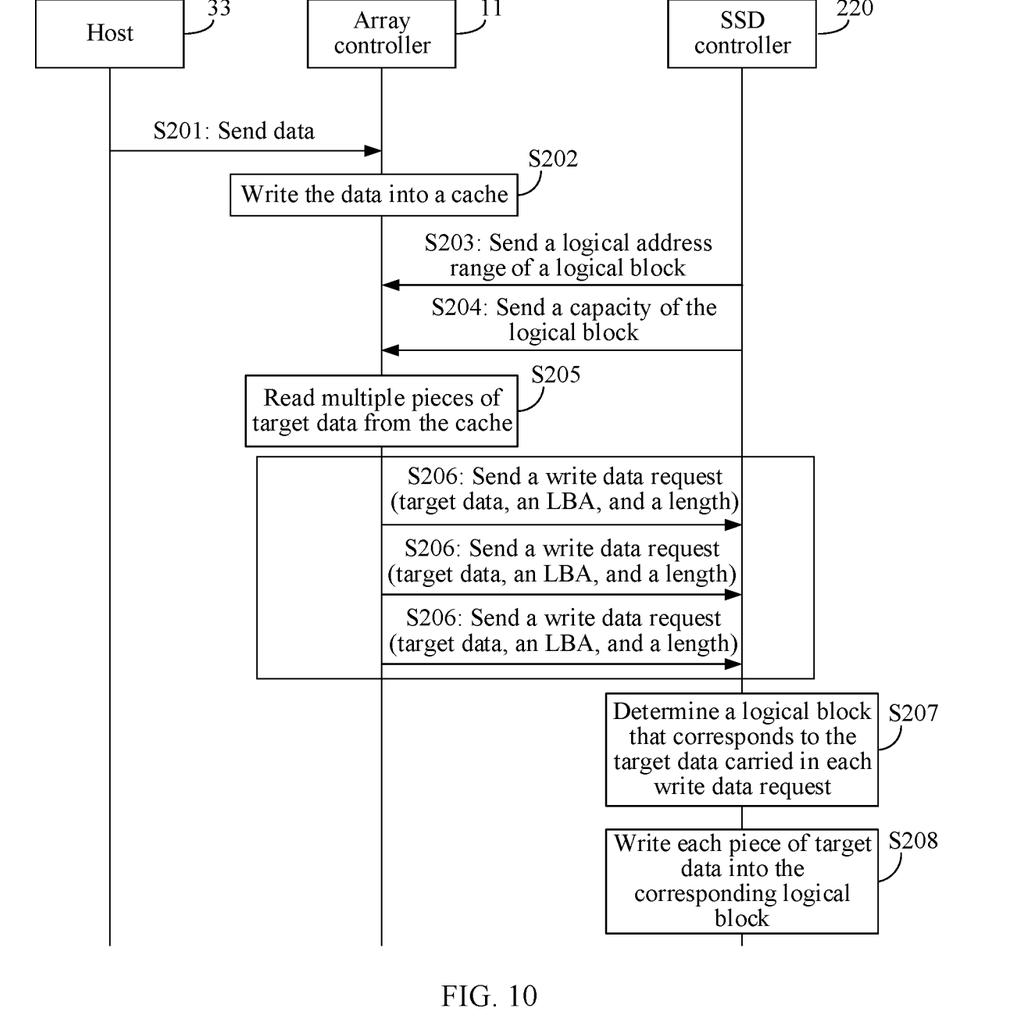
FIG. 10 is a schematic flowchart of a still another method for controlling a solid state disk to write data according to an embodiment of the present application.

The following describes a process of another method for writing data into a solid state disk according to an embodiment of the present application. The method for writing data into a flash memory apparatus in this embodiment of the present application may be applied to the storage system shown in FIG. 1 and the array controller 11 shown in FIG. 6. As shown in FIG. 10, the method includes the following steps:

Step S201: An array controller 11 receives multiple pieces of data from a host 33. This step is similar to step S105 shown in FIG. 8, reference may be made to the description of step S105, and details are not described herein again.

Step S202: The array controller 11 writes the received multiple pieces of data into a cache 120. This step is similar to step S106 shown in FIG. 8, reference may be made to the description of step S106, and details are not described herein again.

Step S203: The array controller 11 receives a logical address range of a logical block from an SSD controller 220.

Specifically, a processor 118 of the array controller 11 receives the logical address range of the logical block. In this embodiment, each logical block corresponds to one logical address range. For example, a logical address range corresponding to a logical block is 0 MB to 1023 MB, a logical address range corresponding to another logical block is 1024 MB to 2047 MB, and a logical address range corresponding to still another logical block is 2048 MB to 3071 MB.

These logical blocks are all logical blocks in the to-be-written state, and the SSD controller 220 needs to report the logical address ranges of these logical blocks to the array controller 11.

Step S204: The array controller 11 receives a size of the logical block from the SSD controller 220. This step is similar to step S104 shown in FIG. 8, reference may be made to the description of step S104, and details are not described herein again.

Likewise, steps S201 to S203 and step S204 are not necessarily performed in a particular order.

Step S205: The array controller 11 reads target data from the cache 120. This step is similar to step S107 shown in FIG. 8, reference may be made to the description of step S107, and details are not described herein again.

Step S206: The array controller 11 sends multiple write data requests to a solid state disk 22.

Specifically, the processor 118 of the array controller 11 sends the write data requests to the solid state disk 22, where each write data request may carry target data, a total size of the target data carried in the multiple write data requests needs to be equal to the size of the logical block. Each write data request carries a start logical address and a length of the target data. The start logical address of the target data and an end logical address of the target data both belong to a logical address range of a same logical block, and the end logical address is obtained according to the start logical address and the length. Therefore, it may be considered that the logical address range of the target data carried in each write data request is a sub-range of the logical address range of the logical block. When receiving logical address ranges of multiple logical blocks, the array controller 11 may select any one from the logical address ranges to determine the start logical address and the length of the target data.

Step S207: After receiving the multiple write data requests, the SSD controller 220 determines a logical block that corresponds to target data carried in each write data request.

In this embodiment, because each logical block corresponds to one logical address range, the SSD controller 220 may determine, according to the start logical address and the length that are carried in each write data request and the logical address range corresponding to each logical block, the logical block corresponding to each piece of target data. For example, for target data carried in one of the write data requests, if a start logical address is 1010 MB and a length is 10 KB, a logical block corresponding to the target data is a logical block whose logical address range is 0 MB to 1023 MB.

Step S208: The SSD controller 220 writes the target data carried in each write data request into the corresponding logical block.

According to the implementation manner shown in FIG. 10, the array controller 11 may also write a segment of data with contiguous logical addresses into one or more blocks.

Figure 9:
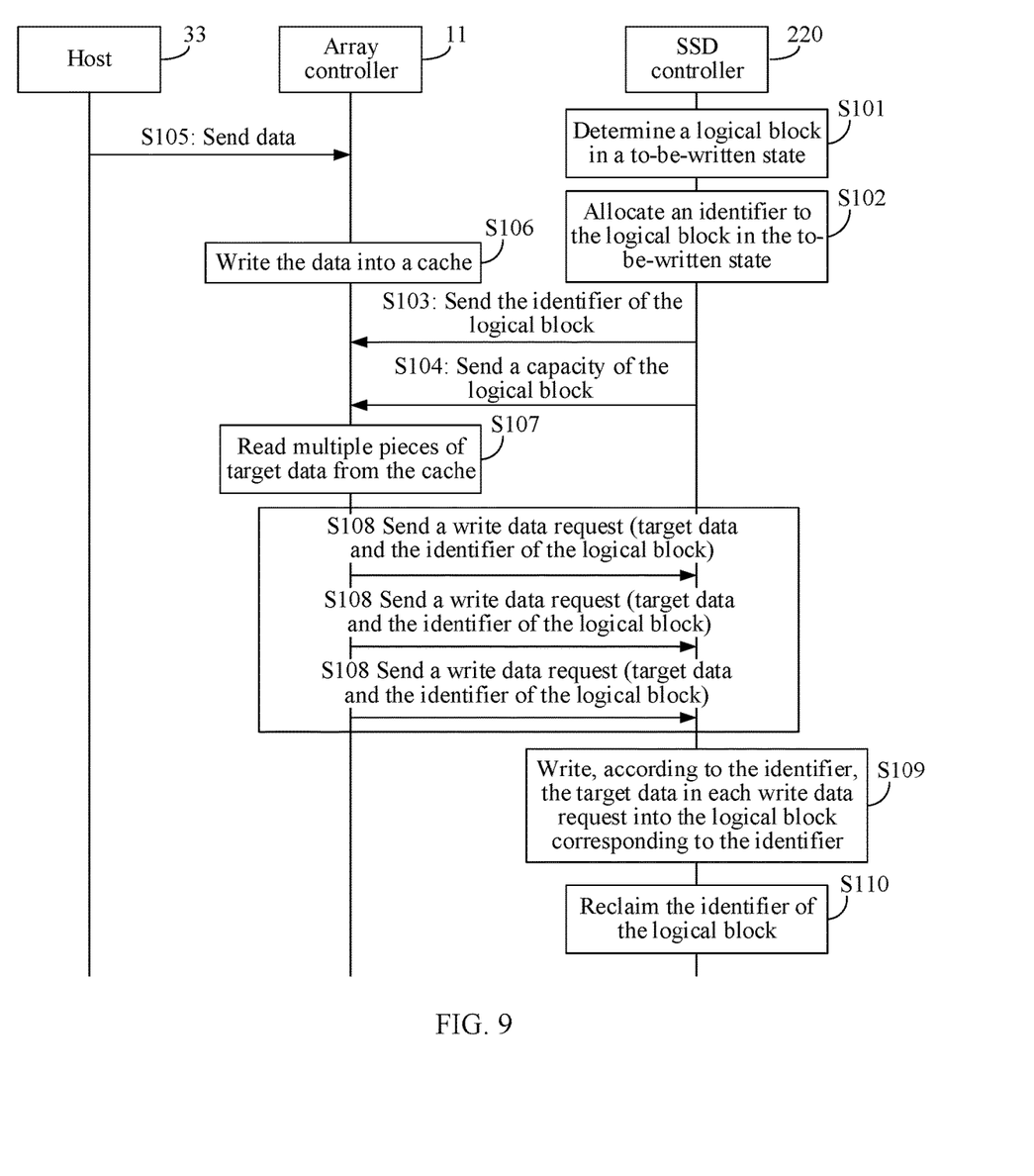
FIG. 9 is a schematic flowchart of another method for controlling a solid state disk to write data according to an embodiment of the present application.

With reference to FIG. 9 and FIG. 10, in another implementation manner of the present application, the solid state disk 22 may divide storage space of a flash memory chip 222 into at least two parts, where each part includes some logical blocks. For one of the parts, the solid state disk 22 allocates an identifier to each logical block included in the part; for the other part, the solid state disk 22 allocates a logical address range to each logical block included in the part. The identifier of each logical block in the first part and the logical address range of each logical block in the second part are reported to the array controller 11. After reading multiple pieces of target data whose lengths are equal to a size of a logical block from the cache 120, the array controller 11 adds the multiple pieces of target data to multiple write data requests, and sends the multiple write data requests to the solid state disk 22. Each write data request of the multiple write data requests may include an identifier of the logical block, or may include a start logical address and a length (which may be considered as a sub-range of a logical address range). That is, in this implementation manner, the array controller 11 may send the multiple write data requests to the solid state disk 22 in the implementation manner shown in FIG. 9, or may send the multiple write data requests to the solid state disk 22 in the implementation manner shown in FIG. 10. For the solid state disk 22, when a write data request received by the solid state disk 22 carries an identifier of a logical block, the solid state disk 22 determines the logical block according to the identifier and writes data into the logical block. When a write data request received by the solid state disk 22 carries a sub-range of a logical address range, the solid state disk 22 may determine a logical block according to the sub-range and the logical address range corresponding to each logical block and write data into the logical block.

Optionally, in the foregoing implementation manner, the storage space of the flash memory chip 222 may further include another part. In the part, the solid state disk 22 may determine a block into which data sent by the array controller 11 is written. That is, a write data request that is sent by the array controller 11 to the solid state disk 22 may not carry an identifier of a logical block or a logical address range of a logical block. In this case, the solid state disk 22 selects one or more blocks for data writing, instead of writing the data into a logical block designated by the array controller 11.

It may be understood that any two of the foregoing three types of storage space division and implementation manners may be combined, which is more flexible compared with execution of only the implementation manner shown in FIG. 9 or FIG. 10, and can satisfy multiple requirements.

Figure 11:
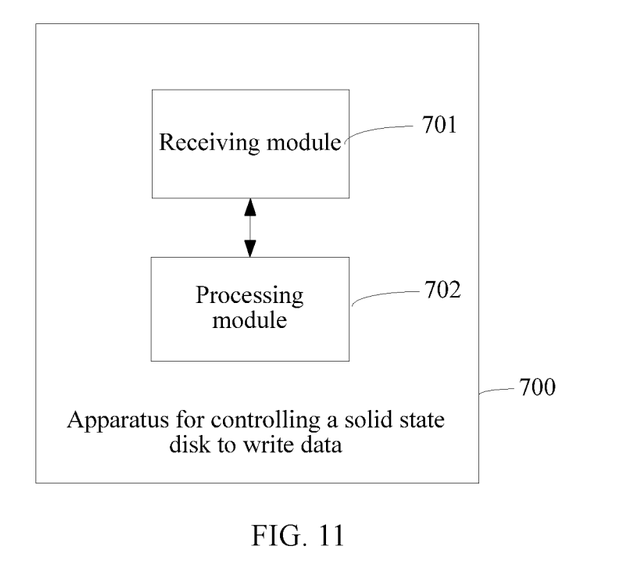
FIG. 11 is a schematic structural diagram of an apparatus for controlling a solid state disk to write data according to an embodiment of the present application.

As shown in FIG. 11, an embodiment of the present application further provides an apparatus 700 for controlling a solid state disk to write data, where the solid state disk is located in a storage system, the storage system further includes an array controller, and the apparatus is located in the array controller. Specifically, the apparatus includes a receiving module 701 and a processing module 702. The receiving module 701 is configured to receive information about a logical block from the solid state disk. The information about the logical block includes a size of the logical block and indication information of the logical block. The processing module 702 is configured to send multiple write data requests to the solid state disk. Each write data request carries target data. Each write data request instructs the solid state disk to write the target data into the logical block indicated by the indication information of the logical block, and a total size of the target data carried in the multiple write data requests is equal to the size of the logical block.

Optionally, the solid state disk includes a flash memory chip, where the flash memory chip includes multiple channels, each channel includes multiple blocks, the logical block includes one or more blocks, and the blocks included in the logical block are located in different channels.

Optionally, the logical block is a logical block in a to-be-written state, where the logical block in the to-be-written state refers to a logical block that has been allocated by the solid state disk to store data.

Optionally, the indication information of the logical block includes an identifier that is allocated by the solid state disk to the logical block, and each write data request includes the identifier of the logical block.

Optionally, the indication information of the logical block includes a logical address range that is allocated by the solid state disk to the logical block, and each write data request includes a sub-range of the logical address range.

Figure 12:
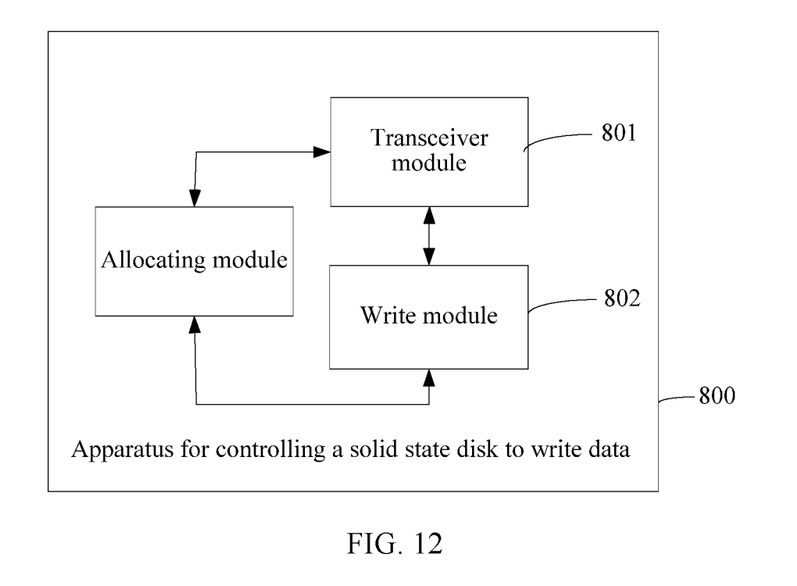
FIG. 12 is a schematic structural diagram of another apparatus for controlling a solid state disk to write data according to an embodiment of the present application.

As shown in FIG. 12, an embodiment further provides another apparatus 800 for controlling a solid state disk to write data, where the solid state disk includes a flash memory chip and a solid state disk controller, the flash memory chip includes multiple channels, each channel includes multiple blocks, and the apparatus is located in the solid state disk controller. The apparatus specifically includes a transceiver module 801 and a write module 802. The transceiver module 801 is configured to send information about a logical block to an array controller The information about the logical block includes a size of the logical block and indication information of the logical block. The transceiver module 801 is further configured to receive multiple write data requests from the array controller. Each write data request carries target data. Each write data request is used to instruct the solid state disk to write the target data into the logical block indicated by the indication information of the logical block. A total size of the target data carried in the multiple write data requests is equal to the size of the logical block. The write module 802 is configured to write the target data carried in each write data request into the logical block indicated by the indication information.

Optionally, the logical block includes one or more blocks, and the blocks included in the logical block are located in different channels.

Optionally, the apparatus 800 further includes an allocating module 803, configured to:

determine that the logical block is a logical block in a to-be-written state, where the logical block in the to-be-written state refers to a logical block that has been allocated to store data; and allocate the indication information to the logical block in the to-be-written state.

Optionally, the indication information of the logical block includes an identifier of the logical block, each write data request includes the identifier of the logical block, and the write module is specifically configured to write, according to the identifier of the logical block, the target data in each write data request into the logical block corresponding to the identifier.

Optionally, the indication information of the logical block includes a logical address range of the logical block. Each write data request includes a sub-range of the logical address range. The write module is specifically configured to determine, according to the sub-range of the logical address range in each write data request and the logical address range of the logical block, the logical block corresponding to the target data in each write data request, and write the target data in each write data request into the corresponding logical block.

Optionally, the allocating module 803 is further configured to reclaim the indication information allocated to the logical block.

What is claimed is:

1. A storage system, comprising:
   a solid state disk (SSD), and an array controller coupled to the SSD, wherein the SSD comprises one or more flash memory chips, each flash memory chip comprises a plurality of physical blocks;
   wherein the array controller is configured to:
      obtain from the SSD, information of a logical block of the SSD, wherein the information of the logical block includes size and identification information of the logical block, wherein the logical block corresponds to multiple physical blocks of the SSD, and the multiple physical blocks are located in different channels of the SSD, and wherein the logical block is in a to-be-written state;
      receive data from a host, wherein the received data has contiguous logical addresses;
      write the received data with contiguous logical addresses into a cache of the array controller;
      when a total size of data in the cache reaches the size of the logical block, divide the data in the cache into one or more data writing requests, wherein each of the data writing requests includes the identification information of the logical block and at least a portion of the data in the cache, and the data in each of the writing requests has contiguous logical addresses; and
      send the one or more data writing requests to the SSD;
   wherein the SSD is configured to:
      receive the one or more data writing requests;
      identify the logical block of the SSD according to the identification information of the logical block included in the one or more data writing requests; and
      write the data carried in the one or more data writing requests to the multiple physical blocks corresponding to the logical block in parallel, such that the multiple physical blocks are filled with the data with contiguous logical addresses.

2. The storage system according to claim 1, wherein the identification information of the logical block comprises an identifier of the logical block, and wherein each of the data writing requests comprises the identifier of the logical block.

3. The storage system according to claim 1, wherein the identification information of the logical block comprises a logical address range of the logical block, and wherein each of the data writing requests comprises a portion of the logical address range.

4. A method for writing data into a solid state disk (SSD), wherein the SSD comprises one or more flash memory chips, each flash memory chip comprises a plurality of physical blocks, the method comprising:
   obtaining from the SSD, by an array controller coupled to the SSD, information of a logical block of the SSD, wherein the information of the logical block includes size and identification information of the logical block, wherein the logical block corresponds to multiple physical blocks of the SSD, and the multiple physical blocks are located in different channels of the SSD, and wherein the logical block is in a to-be-written state;
   receiving, by the array controller, data from a host, wherein the received data has contiguous logical addresses;
   writing, by the array controller, the received data with contiguous logical addresses into a cache of the array controller;
   when a total size of data in the cache reaches the size of the logical block, dividing, by the array controller, the data in the cache into one or more data writing requests, wherein each of the data writing requests includes the identification information of the logical block and at least a portion of the data in the cache, and the data in each of the writing requests has contiguous logical addresses;
   sending, by the array controller, the one or more data writing requests to the SSD;
   identifying, by the SSD, the logical block of the SSD according to the identification information of the logical block included in the one or more data writing requests; and
   writing, by the SSD, the data carried in the one or more data writing requests to the multiple physical blocks corresponding to the logical block in parallel, such that the multiple physical blocks are filled with the data with contiguous logical addresses.

5. The method according to claim 4, wherein the identification information of the logical block comprises an identifier of the logical block, and wherein each of the data writing requests comprises the identifier of the logical block.

6. The method according to claim 4, wherein the identification information of the logical block comprises a logical address range of the logical block, and wherein each of the data writing requests comprises a portion of the logical address range.

* * * * *